Dec. 21, 1965     A. W. CZANDERNA     3,224,521
ULTRAMICROBALANCE BEAM
Filed May 21, 1964
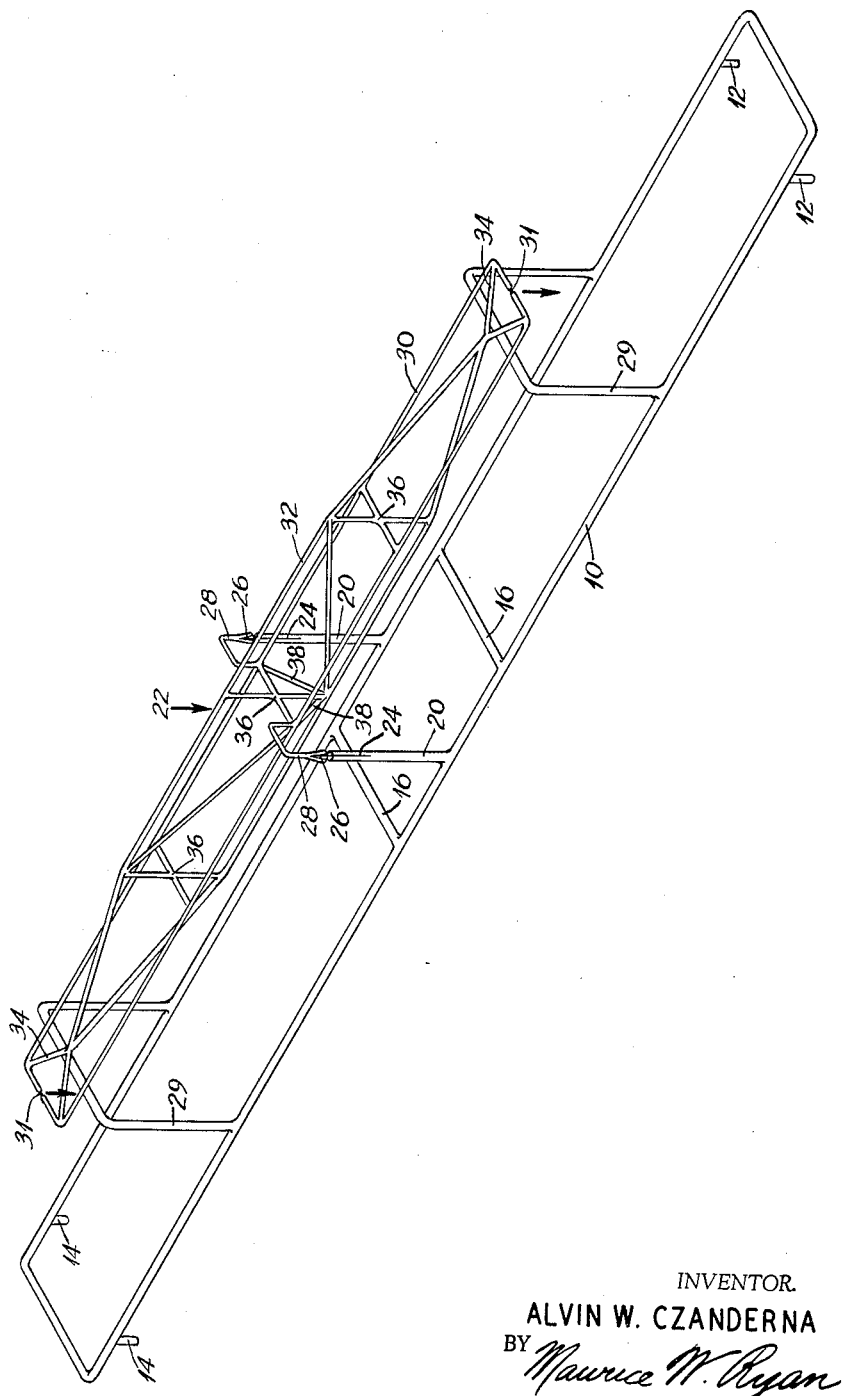
INVENTOR.
ALVIN W. CZANDERNA
BY Maurice W. Ryan
ATTORNEY United States Patent Office
3,224,521
Patented Dec. 21, 1965

3,224,521
ULTRAMICROBALANCE BEAM
Alvin W. Czanderna, Charleston, W. Va., assignor to Union Carbide Corporation, a corporation of New York
Filed May 21, 1964, Ser. No. 369,156
5 Claims. (Cl. 177—246)

This invention relates to improvements in beam-type ultramicrobalances and more particularly is concerned with an improved ultramicrobalance beam of unique structure whereby a hitherto unattainable load capacity, for correspondingly high ratios of load to precision and load to sensitivity, is achieved.

Ultramicrobalances, that is balances capable of determining mass differences of less than one microgram (0.000001 g.), have been known and used for many years and a considerable number of different designs have been proposed in the technical literature. Among the ultramicrobalances in common use are: cantilever-type balances, wherein the deflection of a rod fixed at one end and loaded at the other is measured; torsion-type balances, in which the beam is suspended on a torsion fiber and the beam deflection is measured; helical spring balances, in which the elongation of the helix which is proportional to the mass acting on the spring, is measured; and beam-type balances, wherein a beam is mounted to pivot about a fulcrum and the beam deflection is measured. Beam-type balances may utilize knife-edge fulcrums or may be of the pivotal type wherein the beam pivots about point fulcrums. It is the latter type of balance to which this invention is directed and, as used herein, the term "pivotal ultramicrobalance" will be taken to mean an ultramicrobalance wherein the beam pivots about two points.

Pivotal ultramicrobalances possess important advantages over beam-type ultramicrobalances which utilize a knife-edge fulcrum. For example, the sensitivity of knife-edge balances to very small mass changes is quite limited and wearing of the knife-edge can introduce errors of considerable significance. Furthermore, such balances are not readily adaptable to use in ultra high vacuum. On the other hand, the pivotal ultramicrobalance can be made with a much greater sensitivity, is not nearly as susceptible to change in sensitivity with use, and is readily adaptable to use in ultra high vacuum. However, pivotal ultramicrobalances heretofore known to the art have been undesirably limited in maximum capacity. Thus, for a precision of about 0.2 microgram or greater, the prior art pivotal ultramicrobalances have been limited to a load of not more than about 2 grams on each side of the balance beam. This severely limits the applications in scientific research for which such balances are useful, as in many instances an ultramicrobalance with a capacity of several times this amount yet with comparable precision is needed.

It is an object of this invention to provide an ultramicrobalance incorporating a beam of novel structure which possesses both high capacity and extreme sensitivity. It is a further object of this invention to provide a novel ultramicrobalance beam of high strength and light weight adapted for use in a pivotal ultramicrobalance. A further object is to provide an improved ultramicrobalance beam design that provides great rigidity and resistance to deflection. A still further object is to provide a beam-type ultramicrobalance of extremely rugged construction possessing high accuracy and long term stability. Yet another object of this invention is to provide a beam-type ultramicrobalance, incorporating a beam of novel design, which possesses high load capacity at high load to sensitivity and load to precision ratios.

These and other objects and advantages of the invention will become apparent from the description which follows, taken in connection with the accompanying drawing, which is an isometric projection of an ultramicrobalance beam, constructed in accordance with the present invention, pivotably mounted on a suitable base.

Referring now to the single figure of the drawing, there is shown a rectangular base frame 10 supported by two feet 12, 12 near one end of the frame and two feet 14, 14 near the other end and having cross members 16, 16 which increase its strength and rigidity. Along the mid-axis of base frame 10 at each edge thereof are vertical posts 20, 20 on which a beam 22, consisting of a three-dimensional network of rigid rod-shaped interconnecting structural members, is mounted. The beam 22 pivots about two pointed wires 24, 24 securely embedded in the vertical posts 20, 20 and extending a slight distance above the top surfaces of the posts so as to engage depressions 26, 26 of the shape of parabolic cones formed in vertically downward extending members 28, 28 rigidly secured to the beam 22. The beam 22 is mounted so as to be free to pivot in a vertical plane about the pivot points defined by the points of contact of the pointed wires 24, 24 with the cone-shape depressions 26, 26, but is confined in its pivotal motion by U-shaped beam arrests 29, 29 rigidly secured to the base frame 10 and extending perpendicularly thereto to a height such that the beam 22, when balancing on the pivot points in a perfectly horizontal position, is just slightly above the horizontally disposed members of the beam arrests 29, 29.

A horizontally-disposed, rigid, rectangular frame 30, made up of a plurality of rigid, rod-shaped interconnected structural members and a vertically-disposed rigid frame 32, made up of a plurality of rigid, rod-shaped interconnected structural members, lying in a plane which perpendicularly intersects the plane of the horizontal frame 30, along the mid-axis thereof, and extending equally above and below the plane of the horizontal frame 30, form major structural elements of the three-dimensional beam 22. Each of the structural members of the vertical frame 32 forms the side of at least one triangle and the vertical frame 32 is joined at its ends to the apices of V-shaped structural elements 34, 34 lying in the plane of the horizontal frame 30 and joined to the inside corners thereof. Three cross-shaped structural elements 36, 36, 36 connect structural members of the horizontal frame 30 to structural members of the vertical frame 32 and thereby enhance the strength and rigidity of beam 22. In addition to the structural members forming horizontal frame 30 and vertical frame 32, the beam 22 includes transversely disposed structural members 38, 38 which are not in the plane of either horizontal frame 30 or vertical frame 32 but rather lie in a plane intersecting the planes of these frames and mutually perpendicular thereto. The end members of the horizontal frame 30 contain notches 31, 31 at their mid-points to provide means to secure the sample and counterweights to the beam 22, for example, by use of suspension fibers. The points at which load is thus applied to beam 22 thereby lie in the vertical plane containing vertical frame 32. Transversely-disposed members 38, 38 are so placed as to lie in the transverse plane containing the pivot points defined by the points of contact of the pointed wires 24, 24 with the cone-shaped depressions 26, 26 and are joined to the lower member of vertical frame 32 at a point where the apices of triangles formed by structural members of the vertical frame 32 converge.

In operation of an ultramicrobalance incorporating the novel beam design of this invention, the load is applied to the beam at each end as indicated by the downwardly directed arrows extending from the notches 31, 31 (the load at one end of the beam representing the sample on which mass measurements are to be obtained and that at the other end representing counterweights) and the forces on the beam are thus exerted in the plane containing the vertical frame 32. It is an extremely important feature of this invention that the vertical frame 32 be made of structural members each of which forms the side of a triangle, i.e., every member lying in the plane of vertical frame 32 serves as the side of at least one triangle and these triangles unite to form the frame, since by this means extreme resistance to deflection in a direction perpendicular to the longitudinal axis of the three-dimensional beam is achieved and, thereby, lowering of the center of gravity of the beam due to deflection, with consequent decrease in sensitivity, is minimized. Of course, many different arrangements of triangles to form the vertical frame are possible and all such arrangements are intended to come within the scope of the present invention.

It is a further important feature of this invention that structural members connect the vertically- and horizontally-disposed rigid frames in planes intersecting the planes of the said rigid frames to thereby form an interconnected three-dimensional network of structural members. This construction provides an ultramicrobalance beam with a desirable combination of strength, rigidity and light weight and with great resistance to deflection resulting from forces acting on the beam in any direction whatsoever. In a preferred embodiment of the ultramicrobalance beam of this invention, structural members connecting the vertically- and horizontally-disposed rigid frames are disposed in a plane that intersects the planes of the said rigid frames and that contains the points about which the beam pivots and, in a particularly preferred embodiment, this latter plane and the planes of the vertical and horizontal frames are all mutually perpendicular. Such an arrangement of structural members provides maximum rigidity in both the plane of the load and the plane of the pivot points, where such rigidity is most essential.

Considerable variation in the specific arrangement of the structural members of the beam is, of course, possible within the limitations described herein and additional bracing members can be incorporated, although this is in general undesirable since it adds to the weight of the beam and thereby tends to decrease the sensitivity of the microbalance. The vertically-disposed rigid frame must be substantially perpendicular to the horizontally-disposed rigid frame and substantially longitudinally coextensive therewith, by which is meant in this instance that the length of the shorter frame (which could be either the horizontally-disposed or the vertically-disposed frame depending on the specific design employed) should not be less than about two thirds of the length of the longer frame. The two rigid frames should be connected together proximate their ends but, of course, the specific manner whereby such connection is made is not critical and the drawing herein merely illustrates one convenient arrangement. Both the horizontally-disposed and vertically-disposed rigid frames must be elongated planar structures but their specific geometrical configuration is not critical beyond the requirement that each structural member of the vertically-disposed rigid frame form the side of at least one triangle as hereinbefore disclosed. The horizontally-disposed rigid frame illustrated in the drawing is rectangular and this is a preferred but not an essential feature of the invention. A further design criterion is that the center of gravity of the ultramicrobalance beam should preferably be in, or just below, the horizontal plane containing the pivot points and, preferably, the points at which load is applied to the beam should lie in this same horizontal plane. The particular arrangement of structural members shown in the drawing provides that the center of gravity of the beam $\overline{22}$ is located in the transverse plane containing structural members 38, 38 at a level just below that defined by an imaginary horizontal plane passing through the pivot points and the points at which load is applied to the beam and is thus a preferred arrangement.

The ultramicrobalance beam of this invention can be made up of elongate structural members of any particular cross-sectional shape, for example, the structural members can be tubes or rods of circular, square, rectangular or other cross-sectional configuration, and these members can be joined together in any convenient manner, as by fusing, soldering, or cementing. The material of construction of the beam is not critical as long as it is a material that is chemically inert and that possesses adequate tensile strength. Illustrative of suitable materials are fused quartz, glass, aluminum, magnesium, tungsten, Invar (trademark for a nickel steel with a very low coefficient of thermal expansion), Phosphor bronze, stainless steel, and the like. A preferred material is fused quartz because of its properties of low thermal expansion, low moisture adsorption, chemical inertness, and high strength to weight ratio. Whatever the material of construction and whatever the shape, size and arrangement of structural members employed, the three-dimensional beam should have a length to mass ratio of at least about 10 millimeters per gram, more suitably at least about 50 millimeters per gram, and preferably at least about 75 millimeters per gram, the length being defined as the shortest distance between the points at which the load is applied to the beam, for example, the length of the beam shown in the drawing is the distance between notches 31, 31.

The ultramicrobalance beam can be mounted to permit pivotal motion about the two pivot points in any suitable manner known to the art. A preferred arrangement is to have the beam mounted on fine pointed tungsten wires embedded in vertical posts extending upward from the base frame, with the tungsten wires engaging cone-shaped depressions formed in supporting members rigidly secured to the beam at the mid-axis thereof, as shown in the drawing, but, alternately, the pointed tungsten wires could be embedded in the supporting members secured to the beam and engage cone-shaped depressions formed in the vertical posts extending upward from the base frame. Other materials could be utilized in forming the pivot points, for example, sapphire or diamond, as long as the depression is formed in a material that is as hard or harder than the material forming the point.

An ultramicrobalance beam of the exact structure illustrated in the drawing was constructed entirely from 1 millimeter diameter fused quartz rod and assembled with the aid of suitable jigs as would be understood by one skilled in this art, with the individual structural members being fused together to form the three-dimensional structure. The beam had an overall length of 180 millimeters, with the horizontally-disposed rigid frame having a width of 14 millimeters, and weighed 1.95 grams (length to mass ratio of 92.5 millimeters per gram). The beam was pivoted about two lengths of 20 mil tungsten wire initially sharpened to points of about 1 micron diameter, engaging depressions of the shape of parabolic cones formed in supporting members secured to the beam. The beam was so mounted that when balancing on the pivot points in a perfectly horizontal position it was at a distance of 0.5 millimeter above the beam arrests. The performance of this ultramicrobalance is illustrated by the data presented in the following table, the term "load" referring to the mass applied to each end of the beam.

| Load (gms.) | Period of oscillation (seconds) | Precision (micrograms) | Load to Precision Ratio |
|---|---|---|---|
| 2 | 12.0 | ±0.07 | $0.29 \times 10^8$ |
| 4 | 13.8 | ±0.04 | $1.0 \times 10^8$ |
| 6 | 12.5 | ±0.07 | $0.86 \times 10^8$ |
| 8 | 13.0 | ±0.08 | $1.0 \times 10^8$ |
| 10 | 13.4 | ±0.12 | $0.83 \times 10^8$ |
| 12 | 13.5 | ±0.15 | $0.80 \times 10^8$ |
| 15 | 13.7 | ±0.14 | $1.07 \times 10^8$ |

At a load of 15 grams, the deflection of the end of the beam from the horizontal was approximately 0.5 millimeter. The maximum load to sensitivity ratio was about $4 \times 10^8$.

Ultramicrobalances incorporating the novel beam design of this invention can be operated either as deflection instruments or as null instruments. Methods of operation as a null instrument applicable to beam-type ultramicrobalances are well known to the art and include, for example, detection of beam movement by a light ray reflected to photoelectric cells from a mirror on the beam, or by the change in electrical capacity between a fixed plate and a plate on the beam, or by the change in the magnetic field of a variable permeance transducer resulting from movement of a suitable probe, with magnetic or electrostatic means for applying the force to restore the beam to the null position. Moreover, the said ultramicrobalances can be employed at pressures ranging from superatmospheric to ultra high vacuum in closed system operation and can be baked under load at high temperatures. They are extremely rugged and resistant to shock and possess excellent long term stability of operation, permitting utilization in such fields of research as gas-solid interactions, high temperature chemistry, thermogravimetry, magnetic susceptibility measurements, surface chemistry, corrosion research, and so forth.

The invention has been shown and described in a single preferred form and by way of example and obviously variations and modifications can be made therein without departing from the spirit and scope thereof so that the invention is not to be limited except insofar as such limitations are specified in the following claims.

What is claimed is:

1. In a beam ultramicrobalance of the type wherein the load-carrying beam is mounted on a base so as to permit pivotal motion in a vertical plane about a pair of pivot points, the improvement of a three-dimensional beam constructed of a network of rigid rod-shaped interconnecting structural members whereby an ultramicrobalance possessing high load capacity at high load to sensitivity and load to precision ratios is attained, said three-dimensional beam having a length to mass ratio of at least about 10 millimeters per gram and comprising a plurality of interconnected structural members defining an elongate planar horizontally-disposed first rigid frame; a plurality of interconnected structural members defining a second elongate planar rigid frame which lies in a plane that intersects the plane of said first rigid frame in substantially perpendicular relation and that contains the points at which load is applied to the three-dimensional beam, said first and second rigid frames being substantially longitudinally coextensive and rigidly connected together proximate their ends and said second rigid frame extending above and below the plane of said first rigid frame, each of the structural members of said second rigid frame forming the side of at least one triangle; and a plurality of structural members connecting said first and second rigid frames disposed in at least one plane intersecting the planes of said first and second rigid frames.

2. In a beam ultramicrobalance of the type wherein the load-carrying beam is mounted on a base so as to permit pivotal motion in a vertical plane about a pair of pivot points, the improvement of a three-dimensional beam constructed of a network of rigid rod-shaped interconnecting structural members whereby an ultramicrobalance possessing high load capacity at high load to sensitivity and load to precision ratios is attained, said three-dimensional beam having a length to mass ratio of at least about 50 millimeters per gram and comprising a plurality of interconnected structural members defining an elongate generally rectangular horizontally-disposed first rigid frame; a plurality of interconnected structural members defining a second elongate planar rigid frame which lies in a plane that perpendicularly intersects the plane of said first rigid frame and that contains the points at which load is applied to the three-dimensional beam, said first and second rigid frames being substantially longitudinally coextensive and rigidly connected together proximate their ends and said second rigid frame extending above and below the plane of said first rigid frame, each of the structural members of said second rigid frame forming the side of at least one triangle; and a plurality of structural members connecting said first and second rigid frames in a plane that intersects the planes of said first and second rigid frames and that contains the points about which the three-dimensional beam pivots.

3. In a beam ultramicrobalance of the type wherein the load-carrying beam is mounted on a base so as to permit pivotal motion in a vertical plane about a pair of pivot points, the improvement of a three-dimensional beam constructed of a network of rigid rod-shaped interconnecting structural members whereby an ultramicrobalance possessing high load capacity at high load to sensitivity and load to precision ratios is attained, said three-dimensional beam having a length to mass ratio of at least about 50 millimeters per gram and comprising a plurality of interconnected structural members defining an elongate rectangular horizontally-disposed first rigid frame; a plurality of interconnected structural members defining a second elongate planar rigid frame which lies in a plane that perpendicularly intersects the plane of said first rigid frame and that contains the points at which load is applied to the three-dimensional beam, said first and second rigid frames being substantially longitudinally coextensive and rigidly connected together proximate their ends and said second rigid frame extending equally above and below the plane of said first rigid frame, each of the structural members of said second rigid frame forming the side of at least one triangle; and a plurality of structural members connecting said first and second rigid frames in a plane that perpendicularly intersects each of the planes of said first and second rigid frames and that contains the points about which the three-dimensional beam pivots.

4. The invention according to claim 1 wherein the interconnecting structural members are composed of fused quartz.

5. The invention according to claim 1 wherein the interconnecting structural members are fused quartz rods of about one millimeter diameter.

References Cited by the Examiner

UNITED STATES PATENTS

| 246,057 | 8/1881 | Abbott | 177—195 |
|---|---|---|---|
| 340,012 | 4/1886 | Springer | 177—246 |
| 594,364 | 11/1897 | Thompson | 177—150 |
| 634,495 | 10/1899 | Brunnee | 177—190 |
| 924,962 | 6/1909 | Boling | 177—172 |
| 1,867,008 | 7/1932 | Heusser | 177—171 X |
| 3,133,608 | 5/1964 | Lau | 177—246 X |

FOREIGN PATENTS

| 214 | 2/1857 | Great Britain. |
|---|---|---|
| 17,092 | 7/1907 | Great Britain. |

LEO SMILOW, *Primary Examiner.*